April 16, 1963 R. A. ADEE ET AL 3,085,384
CROP CONDITIONER
Filed March 30, 1960
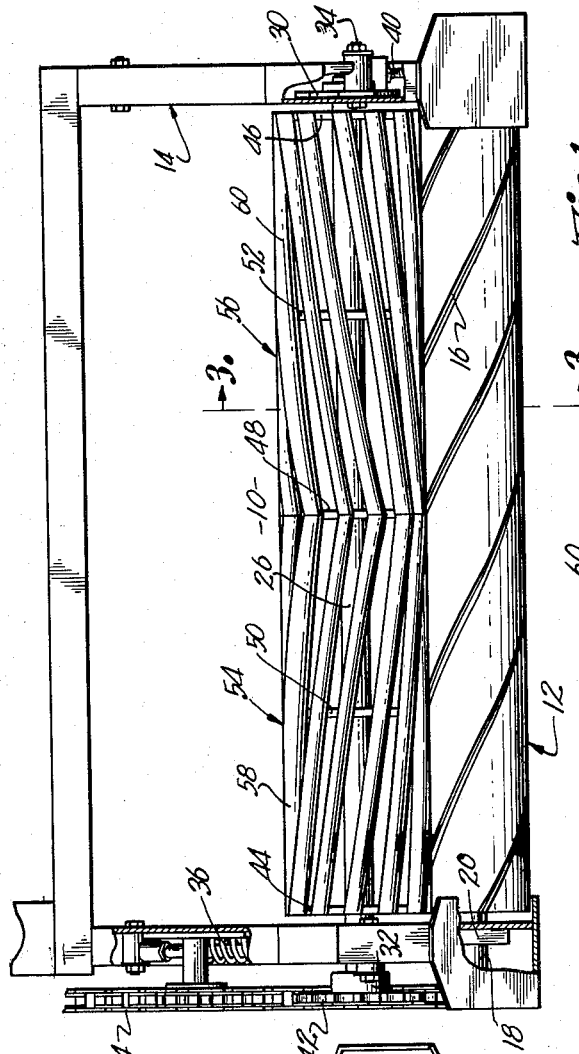
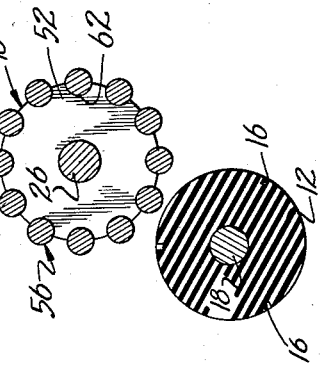
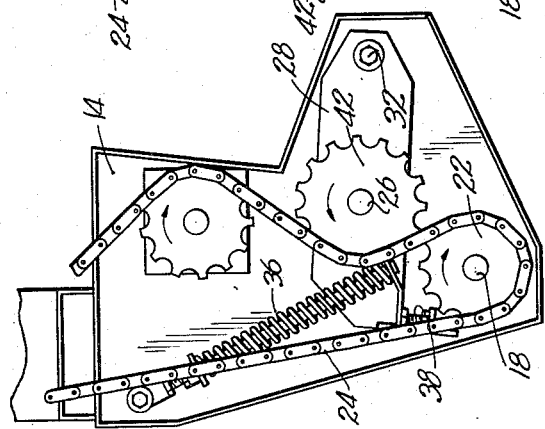
INVENTORS.
Raymond A. Adee
BY Allen A. White
ATTORNEYS.

3,085,384
CROP CONDITIONER
Raymond A. Adee, Newton, and Allen A. White, Peabody, Kans., assignors to Hesston Manufacturing Co., Inc., Hesston, Kans., a corporation of Kansas
Filed Mar. 30, 1960, Ser. No. 18,753
6 Claims. (Cl. 56—1)

This invention relates to an implement for treating freshly cut crops such as alfalfa in a manner to augment drying by crushing, fracturing or otherwise opening the fibrous stems to permit escape of the fluids therein contained.

It is the primary object of the instant invention to provide a crop conditioner that acts upon the crop in a gentle, yet effective way so as to fracture the stems without crushing the leaves or otherwise damaging the latter to cause such leaves to turn brown or dry too rapidly and thereby be lost in subsequent handling of the hay.

The beneficial results emanate from the instant invention by virtue of the use of a pair of juxtaposed rolls, one above the other, the uppermost of which is made up of a multitude of rods having a herringbone arrangement in a skeleton manner so as to progressively move into close relationship to the lower roll whereby, at any given time, only a relatively small portion of each rod acts on the crop being directed between the oppositely rotating rolls, and to the end further, that the upper roll is rendered self-cleaning, eliminates extensive vibration, and has aggressive feeding characteristics.

The lower roll is preferably made from resilient material so as to cooperate with the round rod stock of the upper roll in effecting a proper squeezing action without breakage or undue damage to the stems. There is provided also in the lower frictionable roll, a number of grooves to aid in the secondary function of the lower roll in picking up the crop off the ground.

In the drawing:

FIG. 1 is a fragmentary, front elevational view of a crop conditioner made pursuant to the present invention, parts being broken away for clearness.

FIG. 2 is a fragmentary, end elevational view; and

FIG. 3 is a transverse, cross-sectional view taken on line 3—3 of FIG. 1.

A pair of cooperating, transversely circular, elongated rolls 10 and 12 are supported in juxtaposed relationship by a suitable frame broadly designated by the numeral 14, and it is between the rolls 10 and 12 that the crop to be treated is directed so that a squeezing action is imparted on the crop by the rolls 10 and 12.

The lower roll 12 is preferably made of a resilient material such as relatively hard rubber and is provided with grooves 16 in the periphery thereof primarily for the purpose of a secondary function in the roll 12, i.e., that of picking up the crop off the ground and directing it between the rolls 10 and 12 as they rotate in opposite directions.

The pattern for the grooves 16 is spiral as shown in FIG. 1, but such may be varied as desired, to produce the best results possible. It may be pointed out at this juncture, that one of the objects of the instant invention is to crush the stems of the crop sufficiently to fracture the fibers thereof and permit flow of the juices therefrom, thereby enhancing a quick drying action while at the same time, avoiding undue crushing and damage to the stems. Hence, by the provision of the grooves 16 and further, by arranging the same in a plurality of spirals, much of the crop which lies across the grooves 16 as the crop passes between the rolls 10 and 12 is not crushed, yet, as will hereinafter appear, every stem is squeezed at least once and such is sufficient to accomplish the desired results.

The roll 12 is carried by the frame 14 by means of a longitudinal shaft 18 rotatable within suitable bearings, one of which is illustrated in FIG. 1 and designated by the numeral 20. A sprocket wheel 22 is mounted on one end of the shaft 18, chain 24, coupled with a suitable prime mover (not shown) being trained around the sprocket wheel 22 to drive the latter and, therefore, the roll 12 clockwise, viewing FIG. 2.

The upper roll 10 has a longitudinal shaft 26 normally parallel with the shaft 18 and carried by bearings (not shown) which are in turn mounted on arms 28 and 30. Arms 28 and 30 are mounted on frame 14 by means of pivot pins 32 and 34 respectively, rendering such arms vertically swingable, but yieldably restrained against upward swinging movement by a spring 36. Note that spring 36 is interposed between frame 14 and arm 28 so that roll 10 is maintained in relatively close proximity to the roll 12, yet may move away from the roll 12 as heavy hay or large bunches of the crop pass between the rolls. A similar spring (not shown) is provided for the arm 30. Adjustable stop means 38 and 40 on the frame 14 for the arms 28 and 30 respectively, limit the extent of downward swinging movement of the roll 10, and it is to be preferred that the adjustment be such that the rolls 10 and 12 normally interengage lightly, although they may be slightly spaced as shown in FIG. 3 if desired. A sprocket wheel 42 on shaft 26 is driven by chain 24 counterclockwise, viewing FIG. 2; the rolls 10 and 12 thereby rotating in opposite directions.

Shaft 26 of roll 10 has a number of circular discs secured rigidly thereto, including end discs 44 and 46, median disc 48 and intermediate discs 50 and 52, all of which are concentric with the axis of rotation of shaft 26. And, a plurality of transversely circular rods are welded or otherwise secured directly to the circular peripheries of the discs 44, 46, 48, 50 and 52. Such rods are preferably arranged in two identical sections or banks 54 and 56, the bank 54 being made up of a series of rods 58 and the bank 56 having similar rods 60. As noted in FIG. 3, the discs may be provided with semi-circular notches 62 into which the rods are seated.

Rods 58 and 60 are not in parallelism with the shaft 26 notwithstanding the fact that they form a circular periphery in the roll 10. Instead, they are obliquely arranged with respect to the length of the roll 10. The pattern is such that each rod 58 converges with a corresponding rod 60 as the median disc 48 is approached. On the other hand, each of the rods 58 is in spaced parallelism with the rods 58 next adjacent thereto, and the rods 60 are arranged in the same manner.

Hence, it is seen that during rotation of the rolls 10 and 12, the rods 58 and 60 move first to a position where their innermost ends adjacent disc 48, are in close proximity to the roll 12, and as rotation continues, the inner ends of rods 58 and 60 move away from the roll 12 as the remaining lengths of the rods 58 and 60 approach the roll 12 until the outer ends of rods 58 and 60 adjacent discs 44 and 46 respectively, have moved into close proximity to roll 12 and finally, rotate away from the latter. In effect, therefore, at any given instant, the rolls 10 and 12 act to the maximum extent upon the crop therebetween only at one point in any given rod, i.e., somewhere along one of the rods 58 and somewhere along one of the rods 60. Then, of course, there are moments when little, if any squeezing action takes place, namely, when the rods 58 and 60 are close to, or against the roll 12 across the grooves 16.

In any event, the number of times each stem of the crop is actually squeezed to the maximum extent is appreciably reduced by the construction above described when compared with a structure wherein the crop is directed between a pair of rolls whose surfaces are smooth and uninterrupted. Furthermore, the action on the hay by the arrangement of the instant invention, is appreciably less harsh than in crop conditioners wherein the rolls are made up of intermeshing male and female longitudinal grooves, yet there is sufficient action in the conditioner of the present invention to assure fracture of each stem.

It should not be overlooked also, that the circular cross-sectional contours of the rods 58 and 60 are important for the reason that the rods 58 and 60 tend to roll over the crop gently and without severing any part thereof as would be true if sharp corners or edges were provided. Still further, the arcuate surfaces of the rods 58 and 60 cooperate with the circular periphery of the roll 12 and by virtue of the resiliency of the latter, the crop is pressed into the roll 12 and undue damage is eliminated by virtue of such additional features.

It is, therefore, to be emphasized that crops treated by the conditioner of the present invention, are not chopped into smaller fragments, the leaves are not unduly crushed and damaged, and the stems are fractured only sufficiently to release the moisture content thereof and enhance rapid drying. It has been found that after the crop is sufficiently dry to permit further handling, the leaves have not become unduly brittle and dry. Therefore, in the subsequent handling processes, such leaves remain attached to the dried stems and are salvaged in further harvesting operations.

The above described construction of the roll 10 is important for many reasons. In the first place, by virtue of the fact that the roll 10 is hollow throughout its length, and the rods 58 and 60 are all spaced apart, there is presented a skeleton arrangement that causes the roll 10 to be self-cleaning. The crop does not cling to, choke or clog the roll 10, notwithstanding the fact that fluids are constantly squeezed from the material and tending to create a gummy condition on the two rolls 10 and 12. During operation, there is a constant cleaning of the material off the rods 58 and 60 since material that would otherwise cause the choking, is free to flow through the body of the roll 10.

Another important result attained by the structure is elimination of excessive vibration. If the roll 10 were made up of a plurality of spaced bars extending longitudinally of the roll 10 in parallelism with its axis of rotation, there would be a hammering effect each time the rods moved into contact with the roll 12 or the material between the two rolls 10 and 12. This hammering effect is completely eliminated because of the balanced arrangement provided by the two banks or sections 54 and 56. In this regard, there is no alternate engagement and disengagement between the rolls 10 and 12. Instead, at any given moment, the roll 12 is engaged at five points by the roll 10. By way of explanation, assuming that the roll 12 is engaged by the roll 10 at the median disc 48, at that same moment an adjacent pair of rods 58 and 60 engage the roll 12 intermediate their ends and the next successive third pair of rods 58 and 60 engage the rolls 12 at their outermost ends. The angularity of the rods and the spacing therebetween is such as to present an unusually smooth operation virtually devoid of all vibration.

The herringbone arrangement is important also because it produces an aggressive feeding action in the roll 10. This can be best understood by visualizing the construction as above hypothesized wherein the roll would consist of continuous spaced rods parallel with the axis of shaft 26. In such construction, the upper roll would tend to slip with respect to the crop between the rolls, especially by virtue of the lubrication that is produced by the juices being squeezed from the crop. Such smooth, slick rods would not tend to draw the crop through and between the rolls, whereas the herringbone arrangement produces substantial suction so to speak, in the crop being treated.

Finally, the way in which the roll 10 is floatingly supported is important, considering the fact that each end of the roll 10 is independently movable toward and away from the roll 12 against the action of the two springs 36. Hence, if the crop passing between the rolls is heavy at one end thereof, the proximal spring 36 will yield to permit relative separation of the rolls as needed.

Having thus described the invention what is claimed as new and desired to be secured by Letters Patent is:

1. In a crop conditioner, a pair of elongated, transversely circular, juxtaposed rolls between which the crop is directed for a squeezing action thereon, the rolls having spaced, horizontal axes and being adapted for rotation in opposite directions about said axes, one of the rolls being made from resilient material, the other roll having a circular periphery including a pair of end-to-end sections, each comprised of a continuous series of elongated, parallel rods arranged in a circular pattern concentric with its axis of rotation, the rods of each section extending generally in a direction longitudinally of the other roll and having their longitudinal axes disposed obliquely with respect to the length of said periphery and to the longitudinal axes of the rods of the other section whereby the rods are out of parallelism with the axis of rotation of the other roll, said other roll being hollow throughout its length and said rods all being spaced apart, presenting a skeleton construction, rendering the other roll self cleaning.

2. In a crop conditioner, a pair of elongated, transversely circular, relatively superimposed, juxtaposed rolls between which the crop is directed for a squeezing action thereon, the rolls having spaced, horizontal axes and being adapted for rotation in opposite directions about said axes, the upper roll having a circular periphery composed of a pair of end-to-end sections, each having a continuous series of spaced, elongated, parallel rods arranged in a circular pattern concentric with its axis of rotation, the rods extending generally in a direction longitudinally of the upper roll and having their longitudinal axes disposed obliquely with respect to the length of said periphery whereby the rods are out of parallelism with the axis of rotation of the upper roll, each rod of each section sloping in a direction opposite to and converging with a corresponding rod of the other section intermediate the ends of the upper roll, presenting a herringbone pattern, said upper roll being hollow throughout its length and said rods all being spaced apart, presenting a skeleton construction, rendering the upper roll self cleaning.

3. In a crop conditioner, a pair of elongated, transversely circular, relatively superimposed, juxtaposed rolls between which the crop is directed for a squeezing action thereon, the rolls having spaced, horizontal axes and being adapted for rotation in opposite directions about said axes, the upper roll having a circular periphery composed of a pair of end-to-end sections, each having a continuous series of spaced, elongated, transversely circular, parallel rods arranged in a circular pattern concentric with its axis of rotation, the rods extending generally in a direction longitudinally of the upper roll and having their longitudinal axes disposed obliquely with respect to the length of said periphery whereby the rods are out of parallelism with the axis of rotation of the upper roll, each rod of each section sloping in a direction opposite to and converging with a corresponding rod of the other section intermediate the ends of the upper roll, presenting a herringbone pattern, said upper roll being hollow throughout its length and said rods all being spaced apart, presenting a skeleton construction, rendering the upper roll self cleaning, said rods having a spacing and an inclination to present a number of points of contact between the rolls, said points being spaced longitudinally and circumferentially along the lower roll.

4. In a crop conditioner, a pair of elongated, transversely circular, juxtaposed rolls between which the crop is directed for a squeezing action thereon, the rolls having spaced, horizontal axes and being adapted for rotation in opposite directions about said axes, one of the rolls being made from resilient material and having grooves in its periphery at an oblique angle relative to the axis of said one roll, the other roll having a circular periphery comprised of a continuous series of spaced, elongated, parallel rods arranged in a circular pattern concentric with its axis of rotation, the rods extending generally in a direction longitudinally of the other roll and having their longitudinal axes disposed obliquely with respect to the length of said periphery whereby the rods are out of parallelism with the axis of rotation of the other roll, the angle of divergence of the grooves from the longitudinal axis of said one roll differing from the angle of divergence of the rods from the longitudinal axis of said other roll whereby said rods engage said one roll at spaced points thereon on opposed sides of said grooves.

5. In a crop conditioner, a pair of elongated, transversely circular, juxtaposed rolls between which the crop is directed for a squeezing action thereon, the rolls having spaced, horizontal axes and being adapted for rotation in opposite directions about said axes, one of the rolls being made from resilient material and having grooves in its periphery at an oblique angle relative to the axis of said one roll, the other roll having a circular periphery comprised of a pair of end-to-end sections, each having a continuous series of spaced, elongated, parallel rods arranged in a circular pattern concentric with its axis of rotation, the rods extending generally in a direction longitudinally of said other roll and having their longitudinal axes disposed obliquely with respect to the length of said periphery whereby the rods are out of parallelism with the axis of rotation of the upper roll, each rod of each section converging with a corresponding rod of the other section intermediate the ends of the upper roll, the angle of divergence of the grooves from the longitudinal axis of said one roll differing from the angle of divergence of the rods from the longitudinal axis of said other roll whereby said rods engage said one roll at spaced points thereon on opposed sides of said grooves.

6. In a crop conditioner, a pair of elongated, transversely circular, relatively superimposed, juxtaposed rolls between which the crop is directed for a squeezing action thereon, the rolls having spaced, horizontal axes and being adapted for rotation in opposite directions about said axes, one roll having a circular periphery comprised of a continuous series of spaced, elongated, parallel rods arranged in a circular pattern concentric with its axis of rotation, the rods extending generally in a direction longitudinally of said one roll and having their longitudinal axes disposed obliquely with respect to the length of said periphery whereby the rods are out of parallelism with the axis of rotation of said one roll; individual means pivotally mounting each end of said one roll for independent movement toward and away from adjacent extremities of the other roll; and resilient means at each end respectively of said one roll yieldably biasing opposed ends of said one roll toward the other roll whereby the ends of said one roll may move independently of each other relative to the other roll to provide compensation for varying thickness of the crop passing between the rolls.

References Cited in the file of this patent
UNITED STATES PATENTS

| 2,515,808 | Stoddard | July 18, 1950 |
| 2,711,622 | Cunningham | June 28, 1955 |
| 2,921,426 | Heth | Jan. 19, 1960 |

FOREIGN PATENTS

| 1,162,833 | France | Sept. 17, 1958 |